Oct. 8, 1929.　　　E. A. SPERRY, JR　　　1,730,952

COURSE MAINTAINING MEANS FOR AUTOMATIC PILOTS

Filed June 9, 1927

INVENTOR
ELMER A. SPERRY, JR.
BY
Herbert H. Thompson
his ATTORNEY

Patented Oct. 8, 1929

1,730,952

UNITED STATES PATENT OFFICE

ELMER A. SPERRY, JR., OF BROOKLYN, NEW YORK, ASSIGNOR, BY MESNE ASSIGNMENTS, TO SPERRY GYROSCOPE COMPANY, INC., A CORPORATION OF NEW YORK

COURSE-MAINTAINING MEANS FOR AUTOMATIC PILOTS

Application filed June 9, 1927. Serial No. 197,560.

This invention relates to automatic steering devices for ships or other dirigible vehicles. In such devices the course is usually maintained by a controller governed by a gyroscopic compass, the controller usually having a plurality of relatively movable or adjustable parts, one of which is controlled by the compass, a second by follow-up connections from the rudder and a third by hand for effecting a change of course. Such devices will maintain the ship on the same general heading while the weather conditions of wind and wave do not change materially. On the other hand it has been found that if, for instance, the course is set when there is little or no wind or when the ship is traveling into or before the wind and the wind veers or springs up from a new direction, a small though appreciable change of course will be brought about. The same difficulty is encountered in a multiple screw ship if the relative rate of revolution of the propellers varies. Under such conditions the ship will change its course slightly until the virtual center or zero position of the rudder has moved over sufficiently to hold the ship on its new course under the changed conditions.

The object of this invention is to provide a means for keeping the ship on its original or true course in spite of any or all the adverse conditions mentioned above. One method of accomplishing this purpose is to provide means at the rudder for detecting unequal rudder movements on either side of its central position and to provide means brought into action thereby for giving the rudder a new mean or virtual center. In other words, the rudder is actually offset with respect to the center line of the ship. This method of accomplishing the purposes of the invention was described by me in my prior application #573,280 for automatic steering for dirigible craft, filed July 7, 1922. In my present invention, however, the problem is attacked at or adjacent the controller of the system instead of at the rudder as in my prior invention.

A further object of my invention is to improve or simplify the structure of my prior invention by eliminating all contactors at the rudder end and by other improvements which will be apparent from the following description.

Referring to the drawings in which two embodiments of my invention are shown,

Figure 1:
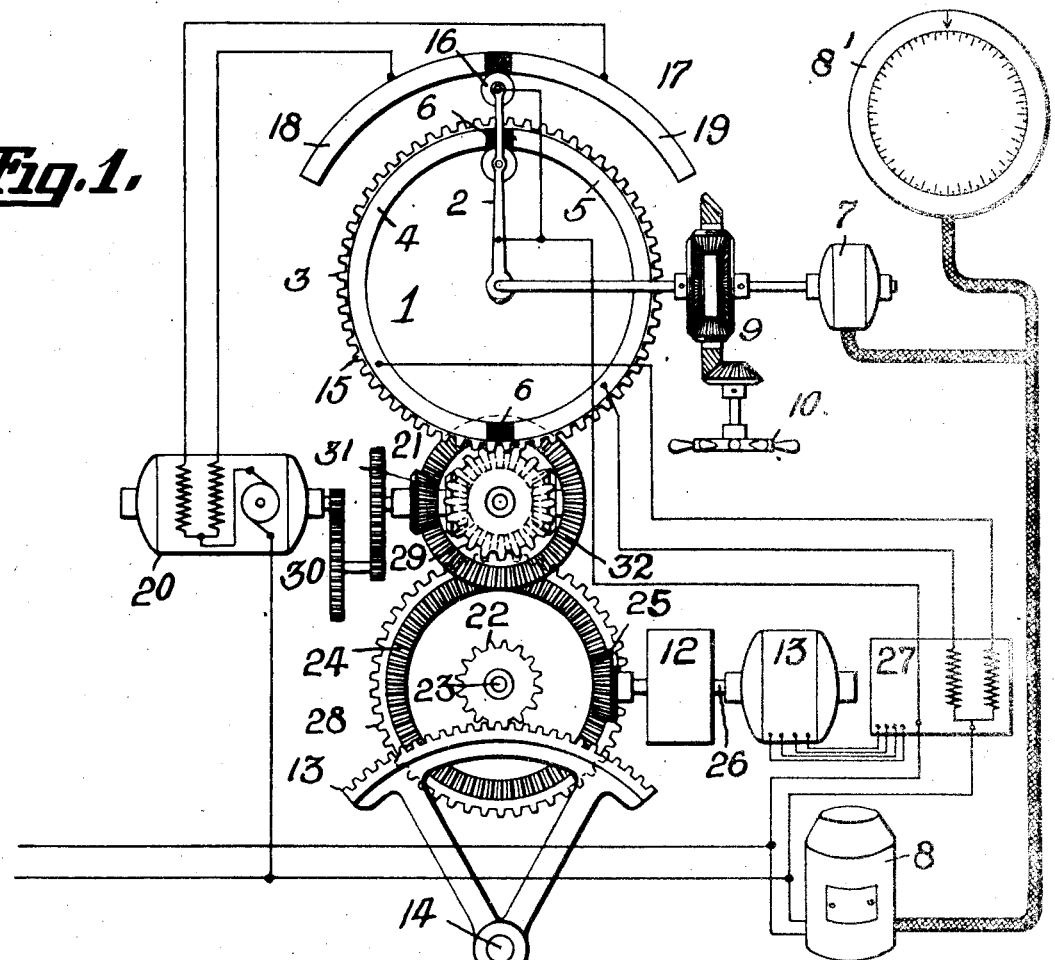
Fig. 1 is a diagram showing in one view the controller and rudder ends of the system with my invention applied to the controller.

In Fig. 1 the controller 1 is shown as consisting of a compass controlled part and a rudder controlled part, both connected to the controller so as to operate differentially. Preferably the compass controlled part is connected to the revoluble brush or trolley 2. The rudder controlled part, with which the trolley 2 cooperates is shown as comprising a pair of reversing contacts 4 and 5 separated by insulated sections 6. For rotating the compass controlled part there is shown a repeater motor 7 ordinarily governed by a gyroscopic compass 8, said motor being connected to the trolley arm 2 through differential gearing 9 in order that the course may be changed through the trick wheel or small pilot wheel 10. At 8' is represented a repeater compass which is normally placed on or adjacent to the master controller. The follow-up from the rudder 11 or steering engine 12 may be effected by any suitable form of remote control which is merely represented in the drawing by gearing connecting a gear sector 13 on the rudder post 14 with gear teeth 15 on the follow-up element 3. When conditions are ideal the contact trolley is in the position shown in Fig. 1, and as the ship yaws equally to each side of the course the rudder is moved an equal amount on each side of the central position.

If now a wind and sea spring up on one bow tending to deflect the course in the opposite direction, the trolley will no longer move equally on each side of the central position and the rudder likewise will no longer be moved equally on each side of the central position. The trolley and rudder will each move much more to one side of their central positions than the other and since every time the ship swings off its course it takes time to bring it back the net result would be a change of average course. To correct this I propose to provide means at the controller which is responsive to continuous yawing of the ship to one side of its course or to a greater yawing to one side than the other, which will bring into action a means for changing the relation between the compass, controller and rudder or steering means so that the true course will be maintained. For this purpose I provide on the controller additional contacts or elements, one part 16 of which rotates with the compass controlled part or trolley 2 and the other part 17 of which is fixed with respect to the ship. The latter part consists of two reversing contact segments 18 and 19 in the form shown in circuit with a slow speed motor 20. Said motor is arranged in the form shown in Fig. 1 to change the relation between the steering engine or rudder and the follow-up portion of the controller by stepping in between the steering engine and controller through a differential mechanism 21 of some character.

As shown the rudder is turned by a pinion 22 meshing with the gear sector 13 on the rudder post. On the shaft 23 of said pinion is a bevel gear 24 driven by a pinion 25 on the shaft 26 of the steering engine 12. As shown the steering engine may be in the form of a motor 13 controlled through a relay 27 from the controller contacts 2, 4 and 5. Said motor may turn the rudder directly by its own power or indirectly through a suitable steering engine represented at 12. Said bevel gear 24 is also provided with spur teeth 28 meshing with a pinion 29 connected to one portion of the differential gearing 21. The central arm of said gearing is turned through the slow speed motor 20 through suitable reduction gearing 30 and bevel pinion 31 meshing with the bevel gear 32. The third element of the differential is also in the form of a spur gear meshing with the gear 15 on the follow-up contactor. As before stated it will be understood that the form of gearing shown between the various elements is diagrammatic only and that any suitable type of follow-up control may be provided between the rudder and controller. The operation of this portion of my invention is as follows:

When, under the conditions assumed above, with a side wind blowing and the trolley working over to one side of the central position, contact will be made between the upper trolley 16 and one of the sectors 18 or 19 as well as between the lower trolley 2 and corresponding sector 4 or 5. The result is that the slow speed motor operating slowly through the differential 21 gradually effects an offset between the rudder and the trolley arm so that the rudder will assume a new mean position somewhat off the center line of the ship while the trolley would be permitted to work back to its centralized position. The rudder would thus be given the proper amount of helm to maintain the ship on its original true course.

Figure 2:
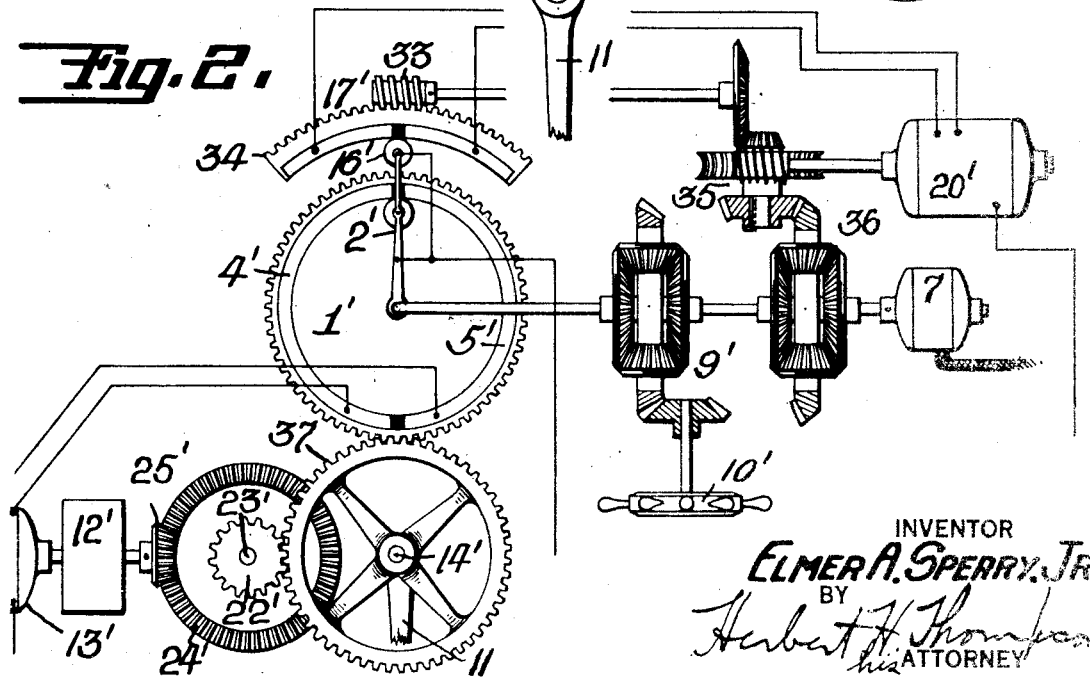
Fig. 2 is a similar diagrammatic view showing a modified method of applying the invention to the controller.

In the modification according to Fig. 2, instead of coming into the follow-up between the steering engine or rudder and the controller, a compensating adjustment is effected on the compass side of the controller. In this form of the invention the auxiliary contact segment 17' is adjustably mounted and is shown as turned by a worm 33 meshing with the wormwheel teeth 34 thereon. The slow speed motor 20' operates said worm through suitable reduction gearing to shift said contact segment and also preferably changes the relation between the compass and the controller by operating on one arm 35 of a second differential gear train 36 placed between the compass repeater motor 7 and the trolley arm 2'. According to this modification, when a side wind springs up or other disturbing factors arise and the trolleys start to oscillate on one side of the central position, the slow speed motor 20' effects automatically a similar function to that now effected by hand in automatic pilots without my invention, namely, it temporarily shifts the trolley slightly so as to maintain the true course by changing the apparent course. This is effected by means of said second differential 36, one arm 35 of which is driven from said slow speed motor 20'. In order to prevent the auxiliary contacts 17' from interfering with maintaining this adjustment, it is also necessary to adjust them in the direction of shift of the trolleys 2' and 16' so that the trolleys will remain in their new position. This purpose is accomplished by the worm 33 driven from motor 20' as described. The rudder 11 and rudder post 14' in this form are shown as turned by gearing 37 from the steering engine 12 as before.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an automatic steering device, the combination with the compass governed controller and steering engine, of means responsive to greater oscillations of the controller to one side of its zero position than the other for changing the relation between the compass, controller and steering engine to centralize the oscillations of the controller and rudder.

2. In an automatic steering device, the combination with the ship's compass and rudder, of a two part controller, one part of which is compass operated and another part is rudder operated, a third part on said controller and cooperating with said first named part, and means governed by said first and third parts for varying the connections between the compass, rudder and said second part for the purpose specified.

3. In an automatic steering device, the combination with the ship's compass and rudder, of a two part controller, one part of which is compass operated and another part is rudder operated, a third part on said controller and cooperating with said first named part, and means governed by said first and third parts for varying the relation between the rudder and the second mentioned part of said controller for the purpose specified.

4. In an automatic steering device, the combination with the ship's compass and rudder, of a two part controller, one part of which is compass operated and another part is rudder operated, a third part on said controller and cooperating with said first named part, and means governed by said first and third parts for varying the relation between the compass and first named part for the purpose specified.

5. In an automatic steering device, the combination with the ship's compass and rudder, of a two part controller, one part of which is compass operated and another part is rudder operated, a third part on said controller and cooperating with said first named part, and means governed by said first and third parts for varying the relation between the compass and first named part and for shifting said third part for the purpose specified.

6. In an automatic steering device, the combination with the ship's compass and rudder, of a two part controller, one part of which is compass operated and another part is rudder operated, a third part on said controller and cooperating with said first named part, differential mechanism between the rudder and said second mentioned part, and means controlled by said first and third parts operating on said differential mechanism for altering the relation between the rudder and compass.

7. In an automatic steering device, the combination with the ship's compass and rudder, of a two part controller, one part of which is compass operated and another part is rudder operated, a third part on said controller and cooperating with said first named part, a slow speed motive mechanism operated from said first and third parts, and differential means for superimposing the movements of said mechanism into the connections between said compass, rudder, and second part for the purpose specified.

8. In an automatic steering device for ships, the combination with the compass, rudder and compass governed controller, of means for preventing the deviation of the ship from its course due to side winds and the like comprising means at the controller for detecting a preponderance of oscillations thereof to one side of the course, and means responsive thereto for changing the relation between the compass and rudder to maintain the ship on its proper course.

9. In an automatic steering device for ships, the combination with the compass, rudder and compass governed controller, of means for preventing the deviation of the ship from its course due to side winds and the like comprising means at the controller for detecting a preponderance of oscillations thereof to one side of the course, and automatic means operated by said last-named means for correcting the set course in proportion to the preponderance of yaw to one side of the original course.

In testimony whereof I have affixed my signature.

ELMER A. SPERRY, Jr.